US012498762B2

(12) United States Patent
Oh

(10) Patent No.: US 12,498,762 B2
(45) Date of Patent: Dec. 16, 2025

(54) DISPLAY DEVICE

(71) Applicant: Samsung Display Co., LTD., Yongin-si (KR)

(72) Inventor: Young Eun Oh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 242 days.

(21) Appl. No.: 18/213,975

(22) Filed: Jun. 26, 2023

(65) Prior Publication Data

US 2024/0118732 A1 Apr. 11, 2024

(30) Foreign Application Priority Data

Oct. 6, 2022 (KR) ........................ 10-2022-0127831

(51) Int. Cl.
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1652* (2013.01); *H04M 1/0222* (2013.01); *H04M 1/0268* (2013.01)

(58) Field of Classification Search
CPC .... G06F 1/1656; G06F 1/1616; G06F 1/1652; H04M 1/0214; H04M 1/0216; H04M 1/0268
See application file for complete search history.

(56) References Cited

U.S. PATENT DOCUMENTS 9,661,719 B2 5/2017 Jang et al.
10,314,184 B2 * 6/2019 Choi ..................... G06F 1/1616
11,474,559 B2 * 10/2022 Kim ..................... G06F 1/1626
2012/0307423 A1 * 12/2012 Bohn .................. H04M 1/0216 361/679.01
2015/0055287 A1 * 2/2015 Seo ..................... H04M 1/0268 361/679.27
2018/0307338 A1 * 10/2018 Park ........................ G06F 3/041
2020/0196461 A1 * 6/2020 Shin ..................... H10K 50/841
2021/0141124 A1 * 5/2021 Park ........................ G09F 9/301
2021/0408412 A1 12/2021 Park
2022/0151083 A1 * 5/2022 Park ..................... H05K 7/2039
2022/0174823 A1 * 6/2022 Kim .................... H04M 1/0216
2022/0261034 A1 * 8/2022 Lee ....................... G06F 1/1652
2022/0377949 A1 * 11/2022 Kim ................... H05K 7/20963

FOREIGN PATENT DOCUMENTS

KR 1020200061272 A 6/2020
KR 102283402 B1 7/2021
KR 1020220001528 A 1/2022
KR 1020220040632 A 3/2022

* cited by examiner

*Primary Examiner* — Abhishek M Rathod
(74) *Attorney, Agent, or Firm* — CANTOR COLBURN LLP

(57) ABSTRACT

A display device includes a display module, a support plate disposed under the display module and including a first support plate, a second support plate, and a plurality of support joints disposed between the first and second support plates, and a cover film disposed under the support plate and covering the support joints. The support joints are not attached to the cover film.

19 Claims, 13 Drawing Sheets

DISPLAY DEVICE

This application claims priority to Korean Patent Application No. 10-2022-0127831, filed on Oct. 6, 2022, and all the benefits accruing therefrom under 35 U.S.C. § 119, the content of which in its entirety is herein incorporated by reference.

BACKGROUND

1. Field

The disclosure relates to a display device.

2. Description of the Related Art

In recent years, with the technological development for the display device, various types of display devices are being developed. For example, various flexible display devices, which are foldable, rollable, or capable of being transformed into a curved shape, are being developed. The flexible display devices may be easy to carry and improve a user's convenience.

Among the flexible display devices, a folding (or foldable) display device is foldable with respect to a folding axis. The folding display device includes a display module foldable with respect to the folding axis and a support portion disposed under the display module and supporting the display module. The support portion is foldable together with the display module.

SUMMARY

In a folding or foldable display device, a support portion may include support bars disposed under a folding portion of a display module. The support bars may be arranged spaced apart from each other. When the folding portion is folded, the support bars may be arranged in a curved shape. Since the support bars are spaced apart from each other, the support bars extending in one direction may be visually recognized as creases in the folding portion The disclosure provides a display device capable of preventing a folding portion thereof from being recognized as creases and placing support joints under the folding portion without employing separate coupling structures.

Embodiments of the invention provide a display device including a display module, a support plate disposed under the display module and including a first support plate, a second support plate, and a plurality of support joints disposed between the first and second support plates, and a cover film disposed under the support plate and covering the support joints. In such embodiment, the support joints are not attached to the cover film.

Embodiments of the invention provide a display device including a display module, a barrier layer disposed under the display module, a support plate disposed under the barrier layer and including a first support plate, a second support plate, and a plurality of support joints disposed between the first and second support plates, and a cover film disposed under the support plate and covering the support joints. In such embodiments, the support joints are not attached to the cover film and the barrier layer.

According to embodiments, the support joints disposed under a folding portion have a stepped shape and are arranged to make contact with each other when a display panel is unfolded, such that the folding portion is prevented from being viewed as creases.

According to embodiments, the cover film disposed under the support joints is in contact with lower sides of the support joints to support the support joints when arranged in a curved line shape, such that a separate structure to rotatably couple the support joints to each other may be omitted.

According to embodiments, as the cover film covers lower portions of the support joints, a foreign substance is effectively prevented from being introduced between the support joints.

BRIEF DESCRIPTION OF THE DRAWINGS

The above and other features of embodiments of the disclosure will become readily apparent by reference to the following detailed description when considered in conjunction with the accompanying drawings, in which.

DETAILED DESCRIPTION

Figure 1:
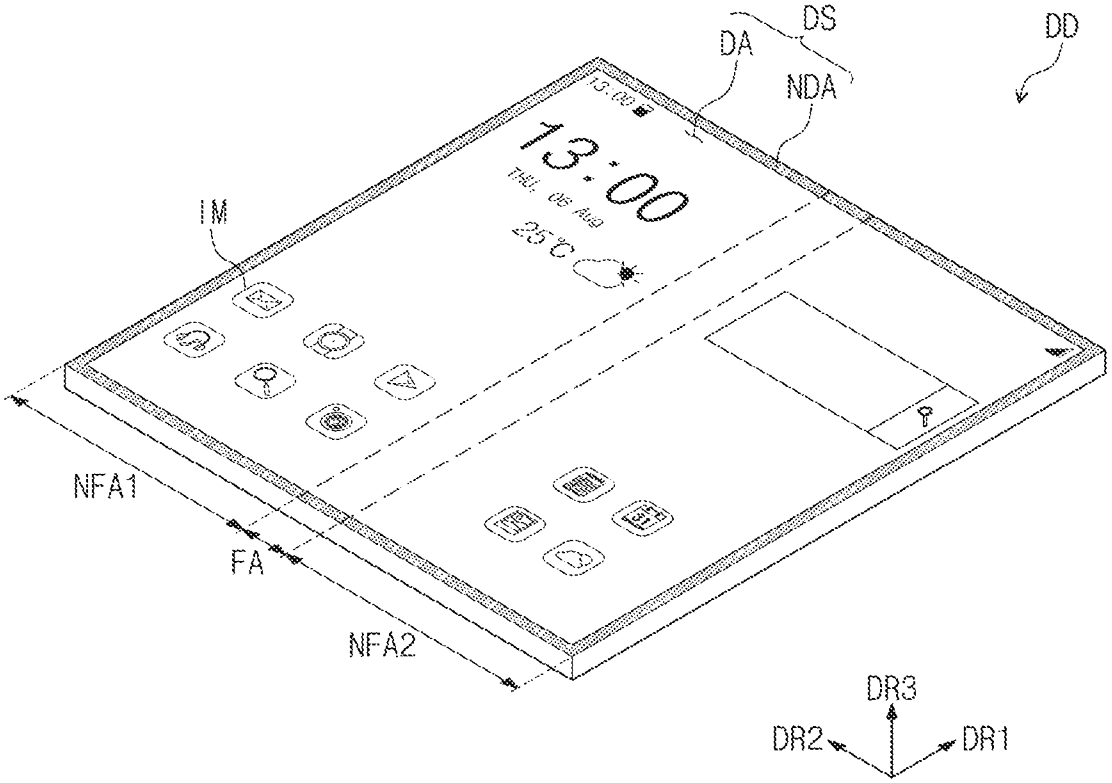
FIG. 1 is a perspective view of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprises" and/or "comprising," or "include" and/or "including", when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2:
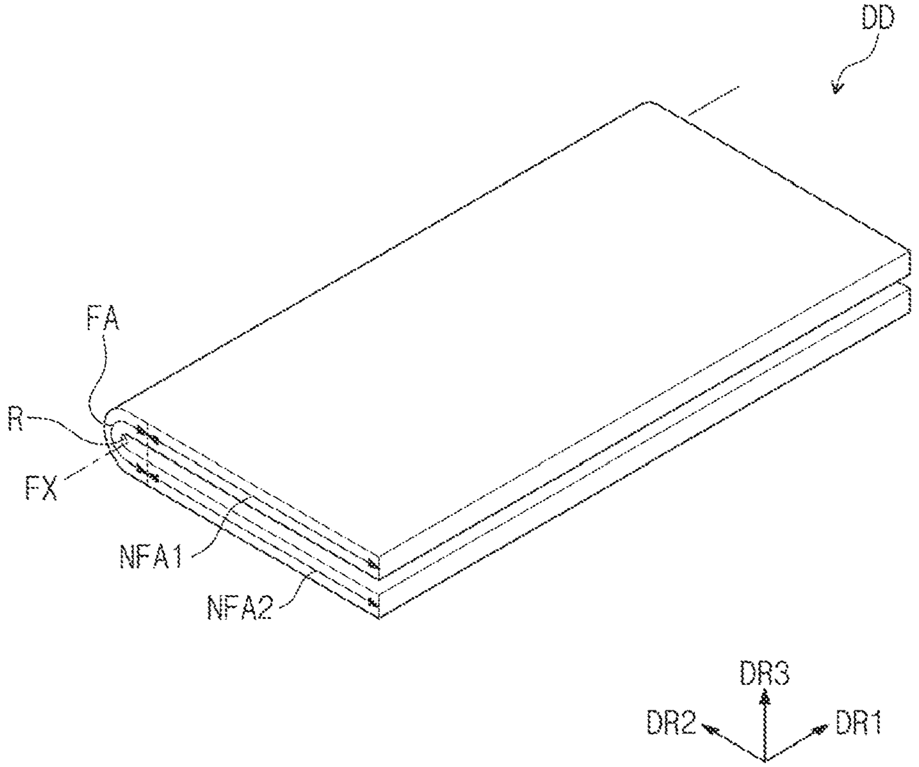
FIGS. 2 and 3 are views of the display device shown in FIG. 1 in a folded state.
Figure 3:
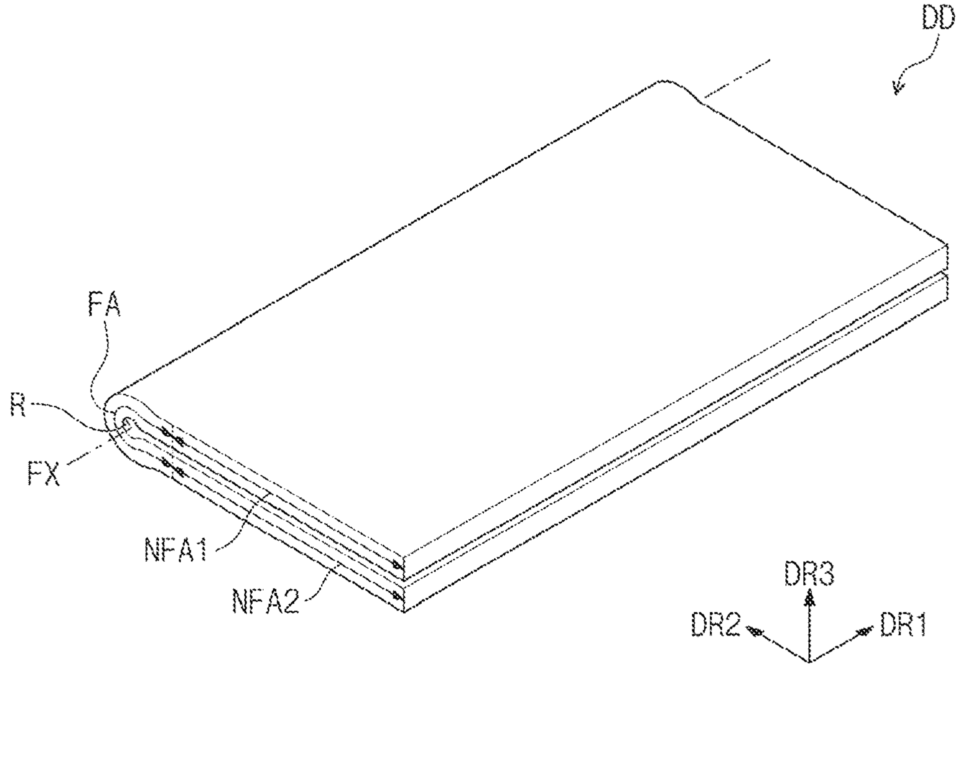

FIG. 1 is a perspective view of a display device DD according to an embodiment of the disclosure. FIGS. 2 and 3 are views the display device DD shown in FIG. 1 in a folded state.

Referring to FIG. 1, in an embodiment, the display device DD may have a rectangular shape defined by long sides extending in a first direction DR1 and short sides extending in a second direction DR2 crossing the first direction DR1. However, the shape of the display device DD should not be limited to the rectangular shape, and the display device DD may have various shapes, such as a circular shape and a polygonal shape. The display device DD may be a flexible display device.

Hereinafter, a direction substantially perpendicular to a plane defined by the first direction DR1 and the second direction DR2 may be referred to as a third direction DR3. The third direction DR3 may be a thickness direction of the display device DD. In the disclosure, the expression "when viewed in a plane" may mean a state of being viewed in the third direction DR3.

The display device DD may include a folding portion FA and a plurality of non-folding portions NFA1 and NFA2. The non-folding portions NFA1 and NFA2 may include a first non-folding portion NFA1 and a second non-folding portion NFA2. The folding portion FA may be disposed between the first non-folding portion NFA1 and the second non-folding portion NFA2. The second non-folding portion NFA2, the folding portion FA, and the first non-folding portion NFA1 may be arranged in the second direction DR2.

In an embodiment, as shown in FIGS. 1 and 2, the display device DD may include a single folding portion FA and two non-folding portions NFA1 and NFA2, however, the number of the folding portions FA and the number of non-folding portions NFA1 and NFA2 should not be limited thereto or thereby. In an alternative embodiment, for example, the display device DD may include more than two non-folding portions and a plurality of folding portions disposed between the non-folding portions.

An upper surface of the display device DD may be referred to as a display surface DS, and the display surface DS may be a plane defined by the first direction DR1 and the second direction DR2. Images IM generated by the display device DD may be provided to a user through the display surface DS.

The display surface DS may include a display area DA and a non-display area NDA around the display area DA. The display area DA may display the image, and the non-display area NDA may not display the image. The non-display area NDA may surround the display area DA and may define an edge of the display device DD, which may be printed by a predetermined color.

Referring to FIGS. 2 and 3, the display device DD may be a foldable display device DD that is folded or unfolded. The folding portion FA may be folded with respect to a folding axis FX substantially parallel to the first direction DR1, and thus, the display device DD may be folded. The folding axis FX may be defined as a major axis substantially parallel to the long sides of the display device DD. The folding portion FA may be folded to have a predetermined radius of curvature R.

When the display device DD is folded, the display device DD may be inwardly folded (in-folding) such that the first non-folding portion NFA1 and the second non-folding portion NFA2 may face each other and the display surface DS may not be exposed to the outside. However, the disclosure should not be limited thereto or thereby. Alternatively, the display device DD may be outwardly folded (out-folding) with respect to the folding axis FX such that the display surface DS may be exposed to the outside.

In an embodiment, as shown in FIG. 2, a distance between the first non-folding portion NFA1 and the second non-folding portion NFA2 may be substantially the same as twice a radius of curvature R of the folding portion FA when the display device DD is folded. However, the disclosure should not be limited thereto or thereby. In an alternative embodiment, as shown in FIG. 3, the distance between the first non-folding portion NFA1 and the second non-folding portion NFA2 may be smaller than twice the radius of curvature R When the display device DD is folded.

Figure 4:
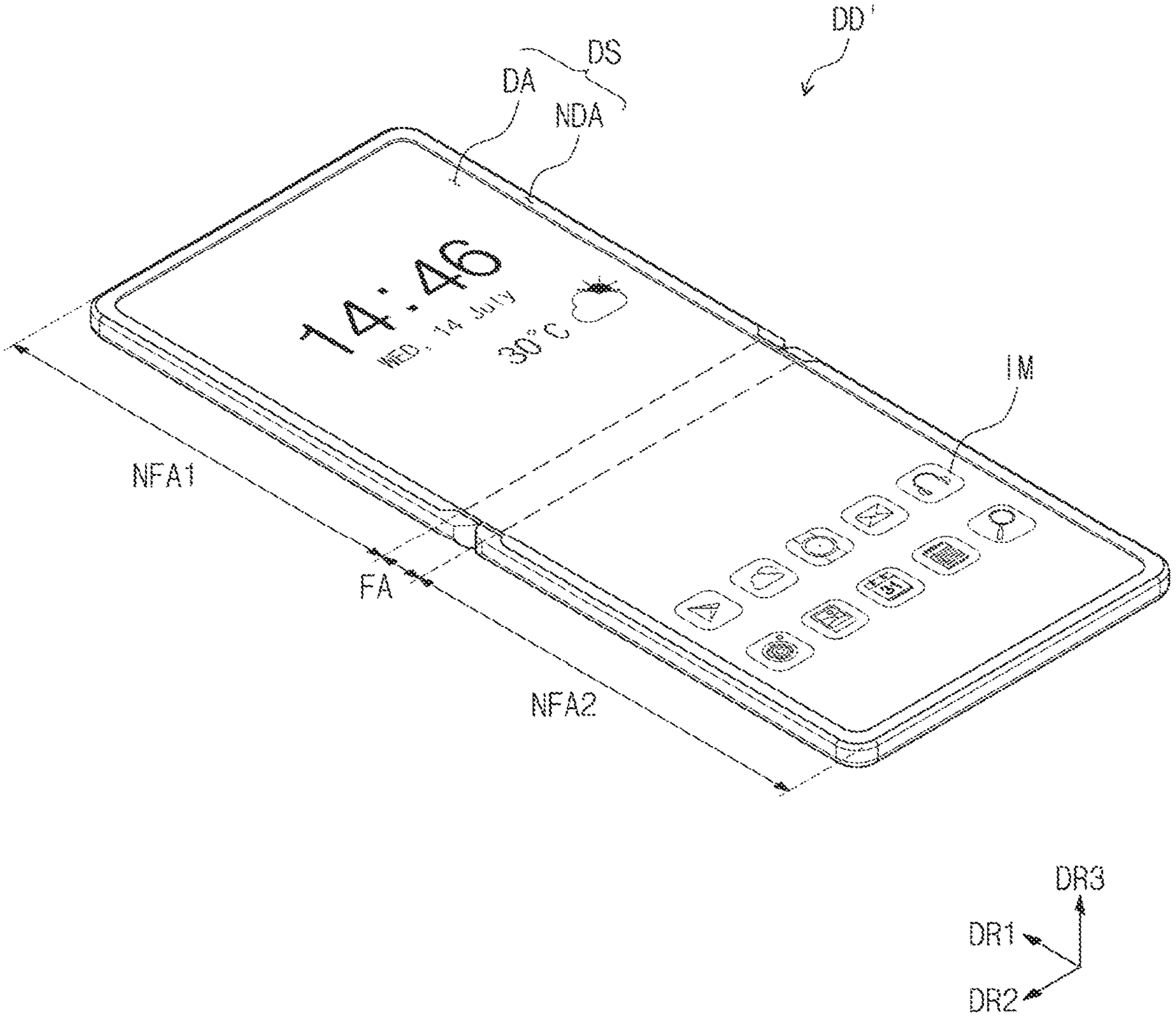
FIG. 4 is a perspective view of a display device according to an alternative embodiment of the disclosure.
Figure 5:
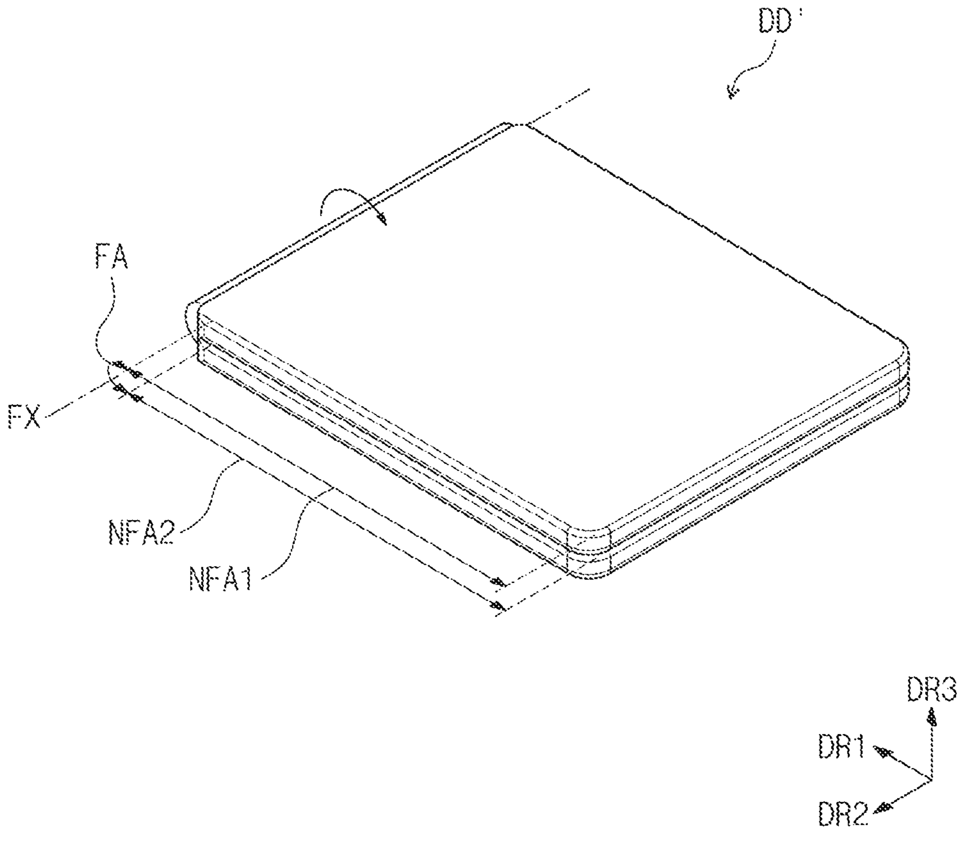
FIG. 5 is a view of the display device shown in FIG. 4 in a folded state.

FIG. 4 is a perspective view of a display device DD' according to an alternative embodiment of the disclosure. FIG. 5 is a view of the display device DD' shown in FIG. 4 in a folded state.

Referring to FIG. 4, in an embodiment, the display device DD' may have a rectangular shape defined by long sides extending in a first direction DR1 and short sides extending in a second direction DR2 crossing the first direction DR1. The display device DD' may include a second non-folding portion NFA2, a folding portion FA, and a first non-folding portion NFA1 arranged in the first direction DR1.

Referring to FIG. 5, the display device DD' may be a foldable display device DD' that is folded or unfolded. The folding portion FA may be folded with respect to a folding axis FX substantially parallel to the second direction DR2, and thus, the display device DD' may be folded. The folding axis FX may be defined as a minor axis substantially parallel to the short sides of the display device DD'. In an embodiment, the display device DD' may be inwardly folded (in-folding), however, the disclosure should not be limited thereto or thereby. In an alternative embodiment, example, the display device DD may be outwardly folded (out-folding).

Hereinafter, embodiment where the display device DD is foldable with respect to the major axis as shown in FIGS. 1 and 2 will be described as a representative example of the disclosure. However, components described hereinafter may be applied to an alternative embodiment, e.g., an embodiment of the display device DD' which is foldable with respect to the minor axis shown in FIGS. 4 and 5.

Figure 6:
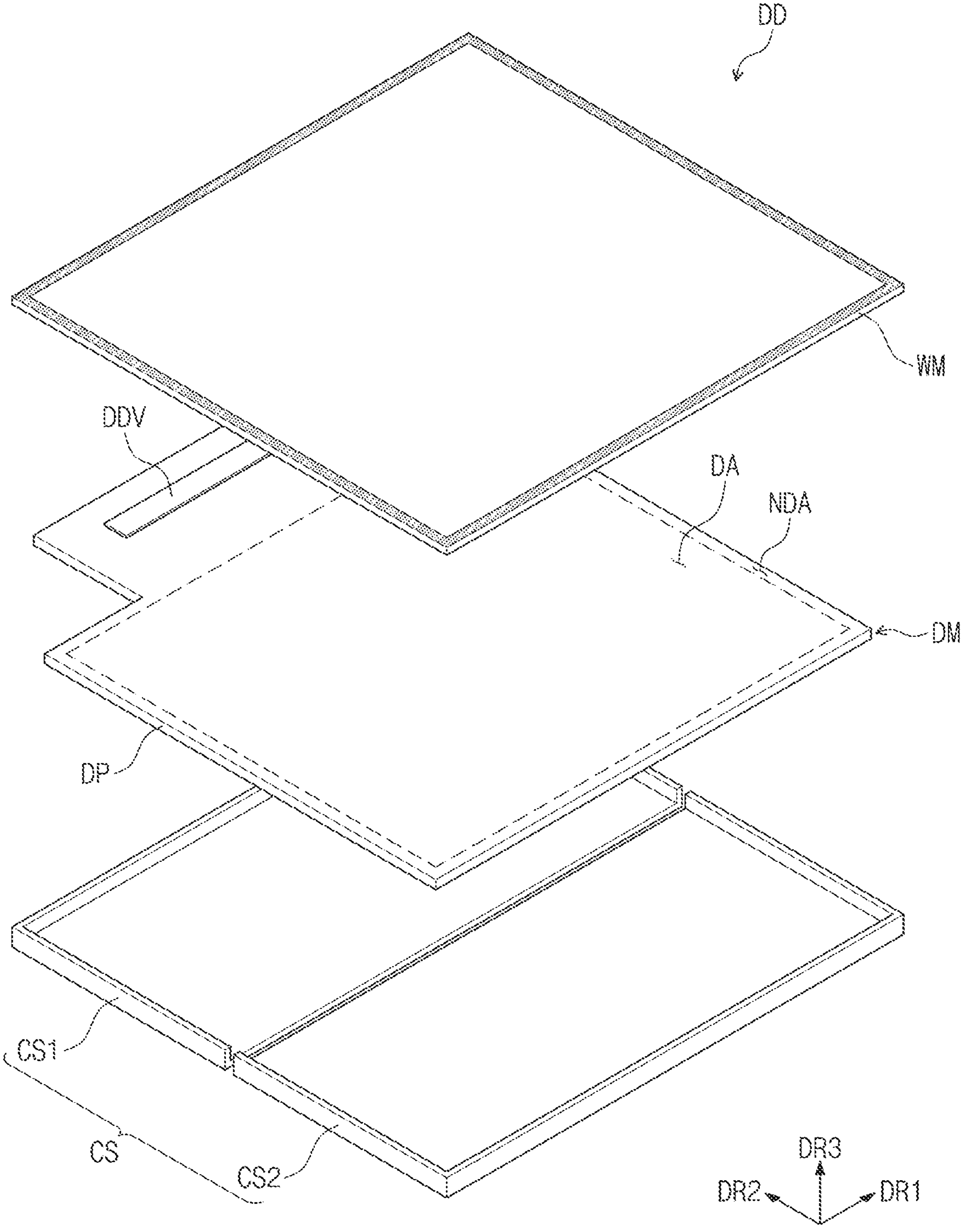
FIG. 6 is an exploded perspective view of the display device shown in FIG. 1.

FIG. 6 is an exploded perspective view of the display device DD shown in FIG. 1.

Referring to FIG. 6, an embodiment of the display device DD may include a window module WM, a display module DM, and a case CS. Although not shown in figures, the display device DD may further include a mechanical structure, e.g., a hinge structure, to control a folding operation of the display module DM.

The display module DM may generate an image and may sense an external input. The window module WM may provide a front surface of the display device DD. The window module WM may be disposed on the display module DM and may protect the display module DM. The window module WM may transmit a light generated by the display module DM to provide the light to a user.

The display module DM may include at least a display panel DP. FIG. 6 shows only the display panel DP among stacked components of the display module DM, however, the display module DM may further include a plurality of components disposed on and under the display panel DP. The detailed stack structure of the display module DM will be described later. The display panel DP may include a display area DA and a non-display area NDA, which respectively correspond to the display area DA (refer to FIG. 1) and the non-display area NDA (refer to FIG. 1) of the display device DD.

The display module DM may include a data driver DDV disposed in the non-display area NDA of the display panel DP. In an embodiment, the data driver DDV may be manufactured in an integrated circuit chip form and may be mounted on the non-display area NDA, however, it should not be limited thereto or thereby. According to an alternative embodiment, the data driver DDV may be mounted on a flexible circuit board connected to the display panel DP.

The case CS may accommodate the window module WM and the display module DM. The case CS may include two cases, e.g., first and second cases CS1 and CS2, to fold the display module DM. The first and second cases CS1 and CS2 may extend in the first direction DR1 and may be arranged in the second direction DR2.

Although not shown in figures, the display device DD may further include a hinge structure to connect the first and second cases CS1 and CS2. The case CS may be coupled to the window module WM. The case CS may protect the window module WM and the display module DM.

Figure 7:
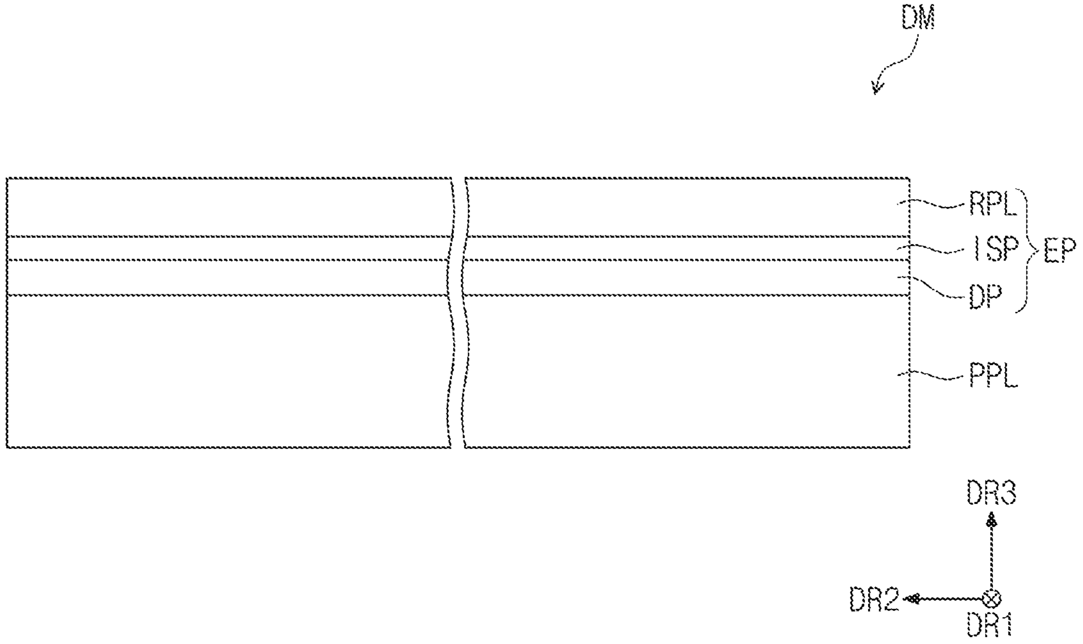
FIG. 7 is a schematic cross-sectional view of a display module shown in FIG. 6.

FIG. 7 is a schematic cross-sectional view of the display module DM shown in FIG. 6.

Referring to FIG. 7, an embodiment of the display module DM may include an electronic panel EP and a panel protective layer PPL disposed under the electronic panel EP. The electronic panel EP may include the display panel DP, an input sensing part ISP disposed on the display panel DP, and an anti-reflective layer RPL disposed on the input sensing part ISP. The display panel DP may be a flexible display panel. In an embodiment, for example, the display panel DP may include a flexible substrate and a plurality of elements disposed on the flexible substrate.

According to an embodiment, the display panel DP may be a light emitting type display panel, however, it should not be limited thereto or thereby. In an embodiment, for example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot or a quantum rod. Hereinafter, for convenience of description, embodiments where the display panel DP is the organic light emitting display panel will be described as a representative example.

The input sensing part ISP may include a plurality of sensors (not shown) to sense an external input by a capacitive method. The input sensing part ISP may be directly manufactured on the display panel DP when the display module DM is manufactured.

The anti-reflective layer RPL may be disposed on the input sensing part ISP. The anti-reflective layer RPL may be directly formed on the input sensing part ISP when the display module DM is manufactured. The anti-reflective layer RPL may be defined as an external light reflection prevention film. The anti-reflective layer RPL may reduce a reflectance of an external light incident to the display panel DP from the above of the display device DD.

In an embodiment, for example, the input sensing part ISP may be disposed directly on the display panel DP, and the anti-reflective layer RPL may be directly formed on the input sensing part ISP, however, it should not be limited thereto or thereby. In an alternative embodiment, for example, the input sensing part ISP may be attached to the display panel DP by an adhesive layer after being manufactured separately from the display panel DP, and the anti-reflective layer RPL may be attached to the input sensing part ISP by an adhesive layer after being manufactured separately from the input sensing part ISP.

The panel protective layer PPL may be disposed under the display panel DP. The panel protective layer PPL may protect a lower portion of the display panel DP. The panel protective layer PPL may include a flexible plastic material. In an embodiment, for example, the panel protective layer PPL may include polyethylene terephthalate (PET).

Figure 8:
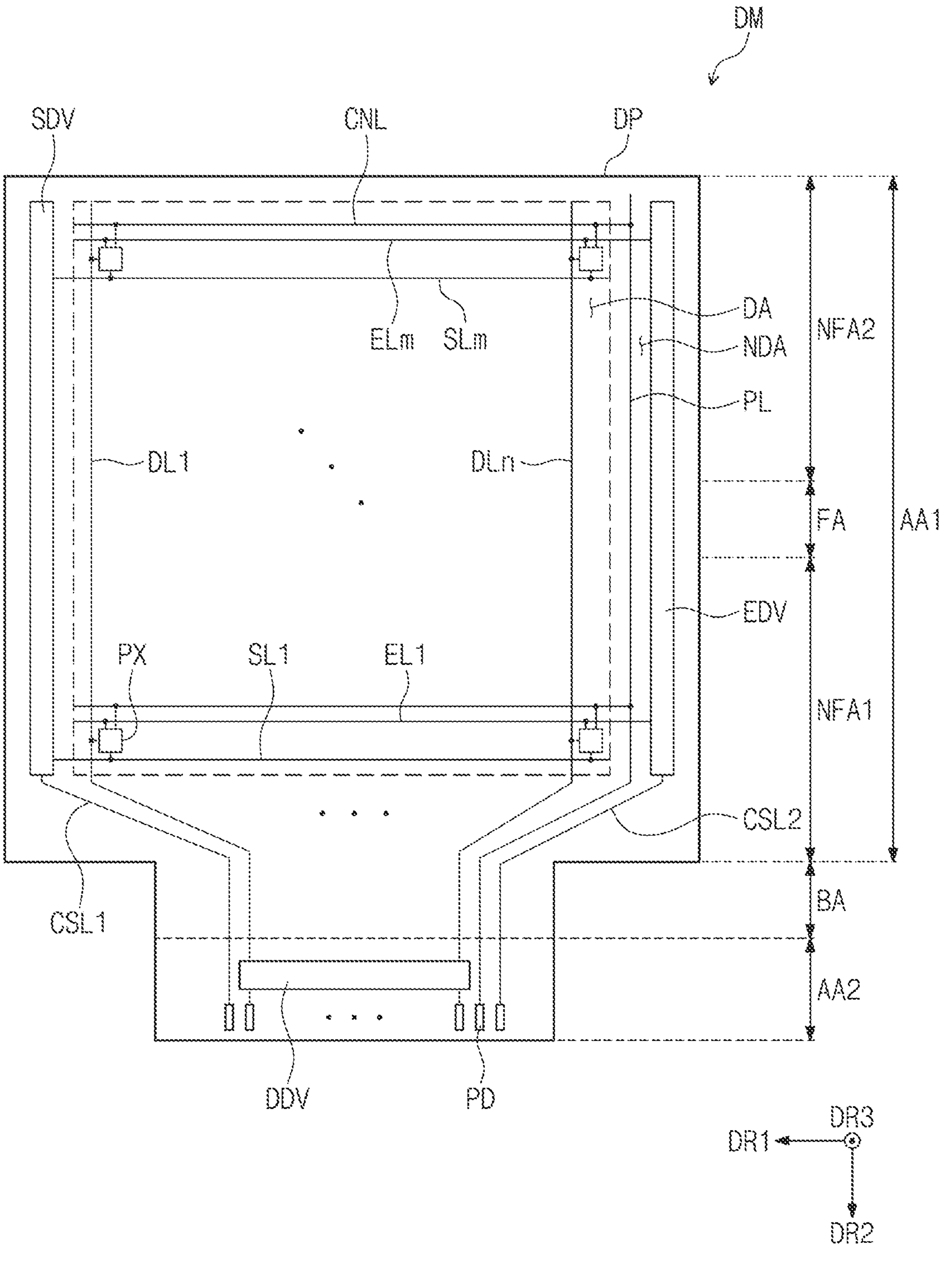
FIG. 8 is a plan view of a display panel shown in FIG. 6.

FIG. 8 is a plan view of the display module DM shown in FIG. 6.

Referring to FIG. 8, in an embodiment, the display module DM may include the display panel DP, a scan driver SDV, a data driver DDV, and an emission driver EDV.

The display panel DP may include a first area AA1, a second area AA2, and a bending area BA between the first area AA1 and the second area AA2. The bending area BA may extend in the first direction DR1, and the first area AA1, the bending area BA, and the second area AA2 may be arranged in the second direction DR2.

The first area AA1 may include the display area DA and the non-display area NDA around the display area DA. The non-display area NDA may surround the display area DA. The display area DA may be an area in which the image is displayed, and the non-display area NDA may be an area in which the image is not displayed. The second area AA2 and the bending area BA may be areas in which the image is not displayed.

When viewed in a plan view in the third direction DR3, the first area AA1 may include the first non-folding portion NFA1, the second non-folding portion NFA2, and the folding portion FA between the first non-folding portion NFA1 and the second non-folding portion NFA2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, a plurality of connection lines CNL, and a plurality of pads PD. Each of "m" and "n" is a natural number. The pixels PX may be arranged in the display area DA and may be connected to the scan lines SL1 to SLm, the data lines DL1 to DLn, and the emission lines EL1 to ELm.

The scan driver SDV and the emission driver EDV may be disposed in the non-display area NDA. The scan driver SDV and the emission driver EDV may be disposed in the non-display area NDA to be respectively adjacent to opposing sides of the first area AA1, which are opposite to each other in the first direction DR1. The data driver DDV may be disposed in the second area AA2. The data driver DDV may be manufactured in an integrated circuit chip form and may be mounted on the second area AA2.

Although not shown in figures, the bending area BA may be bent, and thus, the second area AA2 may be disposed under the first area AA1. Accordingly, the data driver DDV may be disposed under the second area AA2.

The scan lines SL1 to SLm may extend in the first direction DR1 and may be connected to the scan driver SDV. The data lines DL1 to DLn may extend in the second direction DR2 and may be connected to the data driver DDV via the bending area BA. The emission lines EL1 to ELm may extend in the first direction DR1 and may be connected to the emission driver EDV.

The power line PL may extend in the second direction DR2 and may be disposed in the non-display area NDA. The power line PL may be disposed between the display area DA and the emission driver EDV, however, it should not be limited thereto or thereby. Alternatively, the power line PL may be disposed between the display area DA and the scan driver SDV.

The power line PL may extend to the second area AA2 via the bending area BA. When viewed in the plan view, the power line PL may extend toward a lower end of the second area AA2. The power line PL may receive a driving voltage.

The connection lines CNL may extend in the first direction DR1 and may be arranged in the second direction DR2. The connection lines CNL may be connected to the power line PL and the pixels PX. The driving voltage may be applied to the pixels PX via the power line PL and the connection lines CNL connected to the power line PL.

The first control line CSL1 may be connected to the scan driver SDV and may extend toward the lower end of the second area AA2 via the bending area BA. The second control line CSL2 may be connected to the emission driver EDV and may extend toward the lower end of the second area AA2 via the bending area BA. The data driver DDV may be disposed between the first control line CSL1 and the second control line CSL2.

When viewed in the plan view, the pads PD may be disposed adjacent to the lower end of the second area AA2. The data driver DDV, the power line PL, the first control line CSL1, and the second control line CSL2 may be connected to the pads PD.

The data lines DL1 to DLn may be connected to corresponding pads PD via the data driver DDV. In an embodiment, for example, the data lines DL1 to DLn may be connected to the data driver DDV, and the data driver DDV may be connected to the pads PD corresponding to the data lines DL1 to DLn.

Although not shown in figures, the display device DD may further include a timing controller to control an operation of the scan driver SDV, the data driver DDV, and the emission driver EDV and a voltage generator to generate the driving voltage. The timing controller and the voltage generator may be connected to pads PD through a printed circuit board.

The scan driver SDV may generate a plurality of scan signals, and the scan signals may be applied to the pixels PX via the scan lines SL1 to SLm. The data driver DDV may generate a plurality of data voltages, and the data voltages may be applied to the pixels PX via the data lines DL1 to DLn. The emission driver EDV may generate a plurality of emission signals, and the emission signals may be applied to the pixels PX via the emission lines EL1 to ELm.

The pixels PX may receive the data voltages in response to the scan signals. The pixels PX may emit a light having a luminance corresponding to the data voltages in response to the emission signals, and thus, the image may be displayed.

Figure 9:
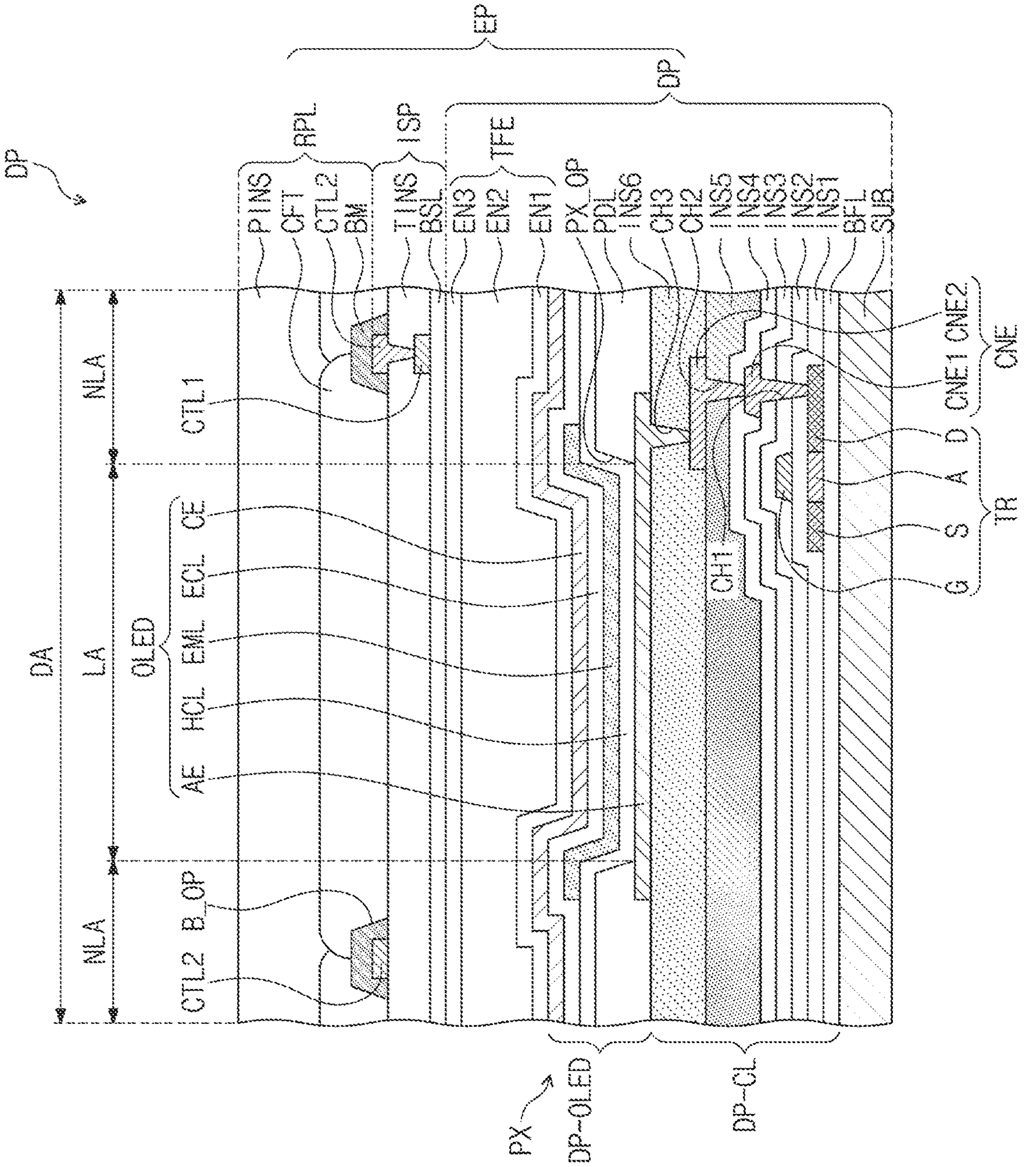
FIG. 9 is a cross-sectional view of a portion of an electronic panel corresponding to one pixel shown in FIG. 8.

FIG. 9 is a cross-sectional view of a portion of the electronic panel corresponding to one pixel shown in FIG. 8.

Referring to FIG. 9, in an embodiment, the pixel PX may include a transistor TR and a light emitting element OLED. The light emitting element OLED may include a first electrode (or an anode) AE, a second electrode (or a cathode) CE, a hole control layer HCL, an electron control layer ECL, and a light emitting layer EML.

The transistor TR and the light emitting element OLED may be disposed on a substrate SUB. In an embodiment, for example, the pixel PX may include a plurality of transistors and at least one capacitor to drive the light emitting element OLED although FIG. 9 shows only one transistor TR for convenience of illustration and description.

The display area DA may include a light emitting area LA corresponding to each pixel PX and a non-light-emitting area NLA around the light emitting area LA. The light emitting element OLED may be disposed in the light emitting area LA.

A buffer layer BFL may be disposed on the substrate SUB, and the buffer layer BFL may be an inorganic layer. A semiconductor pattern may be disposed on the buffer layer BFL. The semiconductor pattern may include polycrystalline silicon, amorphous silicon, or metal oxide.

The semiconductor pattern may be doped with an N-type dopant or a P-type dopant. The semiconductor pattern may include a high-doped region and a low-doped region. The high-doped region may have a conductivity greater than that of the low-doped region and may substantially serve or function as a source electrode and a drain electrode of the transistor TR. The low-doped region may substantially correspond to an active (or a channel) of the transistor TR.

A source S, an active A, and a drain D of the transistor TR may be formed from (or defined by portions of) the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connection electrode CNE may include a first connection electrode CNE1 and a second connection electrode CNE2 to connect the transistor TR to the light emitting element OLED. The first connection electrode CNE1 may be disposed on the third insulating layer INS3 and may be connected to the drain D via a first contact hole CH1 defined through the first, second, and third insulating layers INS1, INS2, and INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 via a second contact hole CH2 defined through the fourth insulating layer INS4 and the fifth insulating layer INS5.

A sixth insulating layer INS6 may be disposed on the second connection electrode CNE2. Layers from the buffer layer BFL to the sixth insulating layer INS6 may be collectively defined as a circuit element layer DP-CL. Each of the first to sixth insulating layers INS1 to INS6 may be an inorganic layer or an organic layer.

The first electrode AE may be disposed on the sixth insulating layer INS6. The first electrode AE may be connected to the second connection electrode CNE2 via a third contact hole CH3 defined through the sixth insulating layer INS6. A pixel definition layer PDL may be disposed on the first electrode AE and the sixth insulating layer INS6. The pixel definition layer PDL may be provided with an opening PX_OP defined therethrough to expose a portion of the first electrode AE.

The hole control layer HCL may be disposed on the first electrode AE and the pixel definition layer PDL. The hole control layer HCL may include a hole transport layer and a hole injection layer.

The light emitting layer EML may be disposed on the hole control layer HCL. The light emitting layer EML may be disposed in an area corresponding to the opening PX_OP. The light emitting layer EML may include an organic material and/or an inorganic material. The light emitting layer EML may generate a light having one of red, green, and blue colors.

The electron control layer ECL may be disposed on the light emitting layer EML and the hole control layer HCL. The electron control layer ECL may include an electron transport layer and an electron injection layer. The hole control layer HCL and the electron control layer ECL may be commonly disposed in the light emitting area LA and the non-light-emitting area NLA.

The second electrode CE may be disposed on the electron control layer ECL. The second electrode CE may be commonly disposed over the pixels PX. A layer in which the light emitting element OLED is disposed may be referred to as a display element layer DP-OLED.

A thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture and oxygen. The second encapsulation layer EN2 may include an organic insulating layer and may protect the pixel PX from a foreign substance such as dust particles.

A first voltage may be applied to the first electrode AE via the transistor TR, and a second voltage having a voltage level lower than that of the first voltage may be applied to the second electrode CE. Holes and electrons injected into the light emitting layer EML may be recombined to generate excitons, and the light emitting element OLED may emit the light by the excitons that return to a ground state from an excited state.

The input sensing part ISP may be disposed on the thin film encapsulation layer TFE. The input sensing part ISP may be directly manufactured on an upper surface of the thin film encapsulation layer TFE.

A base layer BSL may be disposed on the thin film encapsulation layer TFE. The base layer BSL may include an inorganic insulating layer. At least one inorganic insulating layer may be provided on the thin film encapsulation layer TFE as the base layer BS.

The input sensing part ISP may include a first conductive pattern CTL1 and a second conductive pattern CTL2 disposed on the first conductive pattern CTL1. The first conductive pattern CTL1 may be disposed on the base layer BS. An insulating layer TINS may be disposed on the base layer BSL to cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-light-emitting area NLA. Although not shown in figures, the first and second conductive patterns CTL1 and CTL2 may be disposed in the non-light-emitting area NLA between the light emitting areas PA and may have a mesh shape.

The first and second conductive patterns CTL1 and CTL2 may form the sensors of the input sensing part ISP. In an embodiment, for example, the first and second conductive patterns CTL1 and CTL2 having the mesh shape may be separated from each other in a predetermined area to form the sensors. A portion of the second conductive pattern CTL2 may be connected to the first conductive pattern CTL1.

The anti-reflective layer RPL may be disposed on the second conductive pattern CTL2. The anti-reflective layer RPL may include a black matrix BM and a plurality of color filters CFT. The black matrix BM may overlap the non-light-emitting area NLA, and the color filters CFT may overlap the light emitting areas PA, respectively.

The black matrix BM may be disposed on the insulating layer TINS to cover the second conductive pattern CTL2. The black matrix BM may be provided with an opening B_OP defined therethrough to overlap the light emitting area LA and the opening PX_OP. The black matrix BM may absorb and block the light. A width of the opening B_OP of the black matrix BM may be greater than a width of the opening PX_OP of the pixel definition layer PDL.

The color filters CFT may be disposed on the insulating layer TINS and the black matrix BM. The color filters CFT may be disposed in the openings B_OP, respectively. A planarization insulating layer PINS may be disposed on the color filters CFT. The planarization insulating layer PINS may provide a flat upper surface on the color filters CFT.

In a case where the external light incident to the display panel DP is provided to the user after being reflected by the display panel DP, like a mirror, the user may perceive the external light. The anti-reflective layer RPL may include the color filters CFT that display the same colors as those of the pixels to prevent the above-mentioned phenomenon. The color filters CFT may filter the external light to have the same color as the pixels. In this case, the external light may not be perceived by the user.

However, the disclosure should not be limited thereto or thereby, and alternatively, the anti-reflective layer RPL may include a polarizing film to reduce the reflectance with respect to the external light. The polarizing film may be attached to the input sensing part ISP by an adhesive layer after being manufactured separately. The polarizing film may include a retarder and/or a polarizer.

Figure 10:
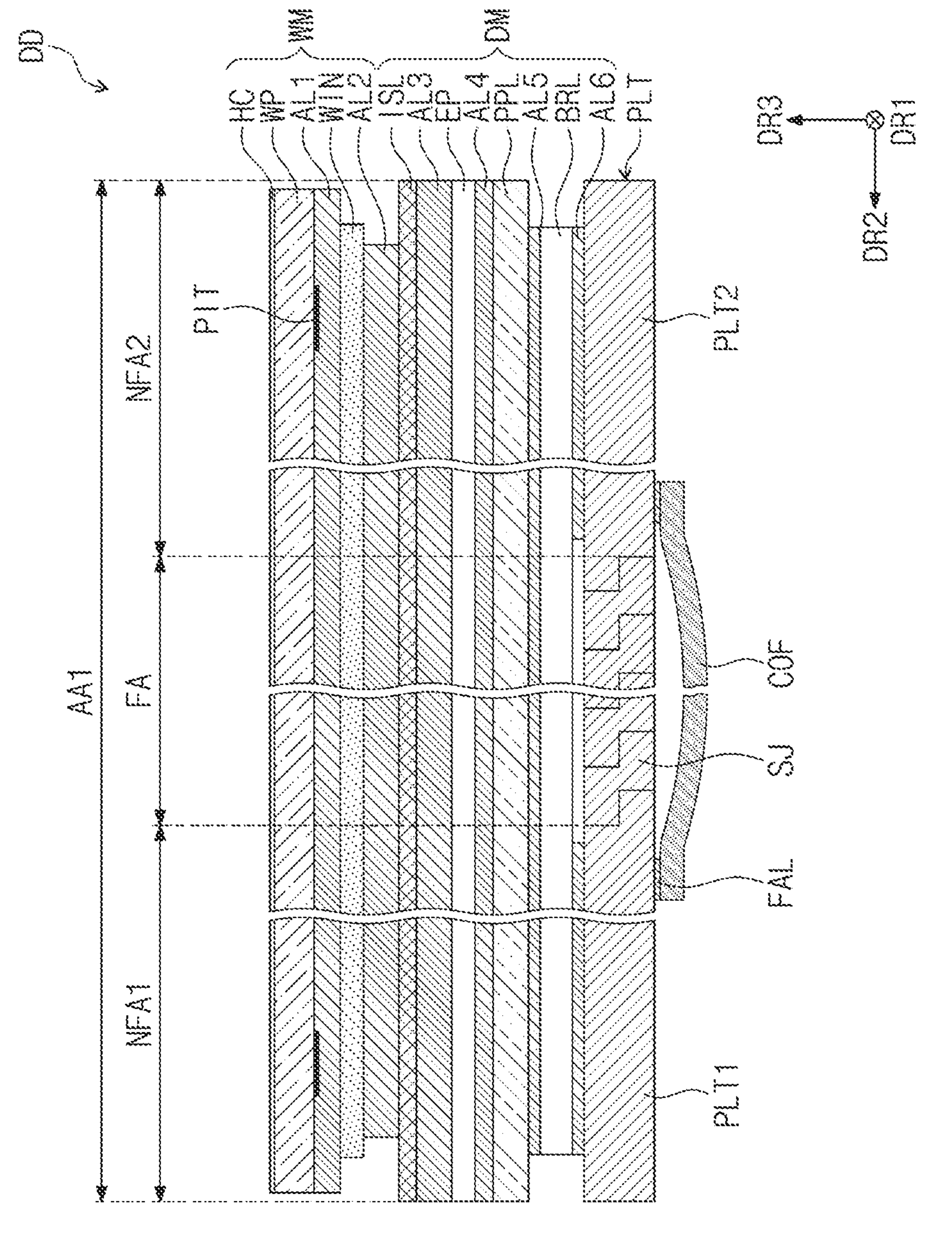
FIG. 10 is a cross-sectional view of a first area shown in FIG. 8 when viewed in a first direction.

FIG. 10 is a cross-sectional view of the first area shown in FIG. 8 when viewed in the first direction DR1.

FIG. 10 shows a cross-section of the display module DM and a cross-section of the window module WM.

Referring to FIG. 10, an embodiment of the display device DD may include the display module DM, the window module WM disposed on the display module DM, a support plate PLT disposed under the display module DM, a cover film COF disposed under the support plate PLT, and a plurality of film adhesive layers FAL. The display module DM may be a flexible display module. The display module DM may include the first non-folding portion NFA1, the folding portion FA, and the second non-folding portion NFA2.

The window module WM may include a window WIN, a window protective layer WP, a hard coating layer HC, and first and second adhesive layers AL1 and AL2. The display module DM may include the electronic panel EP, an impact absorbing layer ISL, the panel protective layer PPL, a barrier layer BRL, and third, fourth, fifth, and sixth adhesive layers AL3, AL4, AL5, and AL6.

Since configurations of the electronic panel EP and the panel protective layer PPL shown in FIG. 10 are substantially the same as those above described with reference to FIG. 7, any repetitive detailed descriptions thereof will be omitted. The impact absorbing layer ISL may be disposed on the electronic panel EP. The impact absorbing layer ISL may absorb external impacts applied to the electronic panel EP from the above of the display device DD and may protect the electronic panel EP. The impact absorbing layer ISL may be manufactured in the form of a stretched film.

The impact absorbing layer ISL may include a flexible plastic material. The flexible plastic material may be defined as a synthetic resin film. In an embodiment, for example, the impact absorbing layer ISL may include the flexible plastic material, such as polyimide (PI) or polyethylene terephthalate (PET).

The window WIN may be disposed on the impact absorbing layer ISL. The window WIN may protect the electronic panel EP from external scratches. The window WIN may have an optically transparent property. The window WIN may include a glass material, however, it should not be limited thereto or thereby. According to an alternative embodiment, the window WIN may include a synthetic resin film.

The window WIN may have a single-layer or multi-layer structure. In an embodiment, for example, the window WIN may include a plurality of synthetic resin films attached to each other by an adhesive or a glass substrate and a synthetic resin film attached to the glass substrate by an adhesive.

The window protective layer WP may be disposed on the window WIN. The window protective layer WP may include the flexible plastic material, such as polyimide (PI) or polyethylene terephthalate (PET). The hard coating layer HC may be disposed on the window protective layer WP.

A print layer PIT may be disposed on a lower surface of the window protective layer WP. The print layer PIT may have a black color, however, a color of the print layer PIT should not be limited to the black color. The print layer PIT may be disposed adjacent to an edge of the window protective layer WP.

The barrier layer BRL may be disposed under the electronic panel EP. In an embodiment, the barrier layer BRL may be disposed under the panel protective layer PPL. The barrier layer BRL may increase a resistance to a compressive force caused by an external pressure. Accordingly, the barrier layer BRL may prevent the electronic panel EP from being deformed. The barrier layer BRL may include the flexible plastic material, such as polyimide or polyethylene terephthalate.

The barrier layer BRL may have a color absorbing the light. In an embodiment, for example, the barrier layer BRL may have a black color. In such an embodiment, when looking at the display module DM from an upper side of the display module DM, components disposed under the barrier layer BRL may not be viewed by the user.

The first adhesive layer AL1 may be disposed between the window protective layer WP and the window WIN. The window protective layer WP may be attached to the window WIN by the first adhesive layer AL1. The first adhesive layer AL1 may cover the print layer PIT.

The second adhesive layer AL2 may be disposed between the window WIN and the impact absorbing layer ISL. The window WIN may be attached to the impact absorbing layer ISL by the second adhesive layer AL2.

The third adhesive layer AL3 may be disposed between the impact absorbing layer ISL and the electronic panel EP. The impact absorbing layer ISL may be attached to the electronic panel EP by the third adhesive layer AL3.

The fourth adhesive layer AL4 may be disposed between the electronic panel EP and the panel protective layer PPL. The electronic panel EP may be attached to the panel protective layer PPL by the fourth adhesive layer AL4.

The fifth adhesive layer AL5 may be disposed between the panel protective layer PPL and the barrier layer BRL. The panel protective layer PPL may be attached to the barrier layer BRL by the fifth adhesive layer AL5.

The support plate PLT may be disposed under the barrier layer BRL. The barrier layer BRL may be disposed between the electronic panel EP and the support plate PLT. The sixth adhesive layer AL6 may be disposed between the barrier layer BRL and the support plate PLT. The barrier layer BRL may be attached to the support plate PLT by the sixth adhesive layer AL6.

The sixth adhesive layer AL6 may overlap the first and second non-folding portions NFA1 and NFA2 and may not overlap the folding portion FA. In such an embodiment, the sixth adhesive layer AL6 may not be disposed in the folding portion FA.

The support plate PLT may be disposed under the display module DM and may support the display module DM. The support plate PLT may have a rigidity greater than that of the display module DM. The support plate PLT may include a metal material or a non-metallic material.

In an embodiment, for example, the support plate PLT may include a metal material such as a stainless steel. According to an embodiment, the support plate PLT may include a non-metallic material such as a fiber reinforced composite. The fiber reinforced composite may include a carbon fiber reinforced plastic (CFRP) or a glass fiber reinforced plastic (GFRP).

The support plate PLT may include a first support plate PLT1, a second support plate PLT2, and a plurality of support joints SJ. The support joints SJ may be disposed between the first support plate PLT1 and the second support plate PLT2. The second support plate PLT2, the support joints SJ, and the first support plate PLT1 may be arranged in the second direction DR2.

When viewed in the plan view, the first support plate PLT1 may overlap the first non-folding portion NFA1, the second support plate PLT2 may overlap the second non-folding portion NFA2, and the support joints SJ may overlap the folding portion FA. The support joints SJ may have a stepped shape and may be arranged to be engaged with each other. The structure of the support joints SJ will be described below in greater detail.

The support joints SJ may not be attached to the display module DM. In an embodiment, for example, the support joints SJ may not be attached to the barrier layer BRL. The sixth adhesive layer AL6 disposed between the support plate PLT and the barrier layer BRL may not be disposed on the support joints SJ.

The cover film COF may be disposed under the support plate PLT and may cover the support joints SJ. The cover film COF may not be attached to the support joints SJ.

The cover film COF may be disposed under the support joints SJ and may extend to the first support plate PLT1 and the second support plate PLT2. In an embodiment, for example, the cover film COF disposed under the support joints SJ may extend to a portion of the first support plate PLT1 adjacent to the support joints SJ and a portion of the second support plate PLT2 adjacent to the support joints SJ.

The cover film COF may be attached to the first support plate PLT1 and the second support plate PLT2. In an embodiment, for example, the film adhesive layers FAL may be disposed between the first and second support plates PLT1 and PLT2 and the cover film COF.

The film adhesive layers FAL may be respectively disposed under the portion of the first support plate PLT1 adjacent to the support joints SJ and the portion of the second support plate PLT2 adjacent to the support joints SJ. The film adhesive layers FAL may not be disposed between the cover film COF and the support joints SJ. In an embodiment, for example, two film adhesive layers FAL are shown, however, the number of the film adhesive layers FAL should not be limited thereto or thereby.

The cover film COF may be attached to the first support plate PLT1 and the second support plate PLT2 by the film adhesive layers FAL. The film adhesive layers FAL may be adjacent to opposing ends of the cover film COF, which are opposite to each other in the second direction DR2.

The first to sixth adhesive layers AL1 to AL6 and the film adhesive layers FAL may include a pressure sensitive adhesive (PSA), however, they should not be limited thereto or thereby.

The cover film COF may include polyethylene terephthalate (PET), polybutylene terephthalate (PBT), polyethylene naphthalate (PEN), polycarbonate (PC), polymethyl methacrylate (PMMA), poly-styrene (PS), poly vinyl chloride (PVC), polyethersulfone (PES), poly-ethylene (PE), polypropylene (PP), poly amide (PA), modified polyphenylene oxide (m-PPO), polyoxymethylene (POM), polyphenylsulfone (PSU), poly phenylene sulfide (PPS), polyimide (PI), polyetherimide (PEI), polyetheretherketone (PEEK), polyamide-imide (PAI), polyarylate (PAR), or polyurethane (PU).

Figure 11:
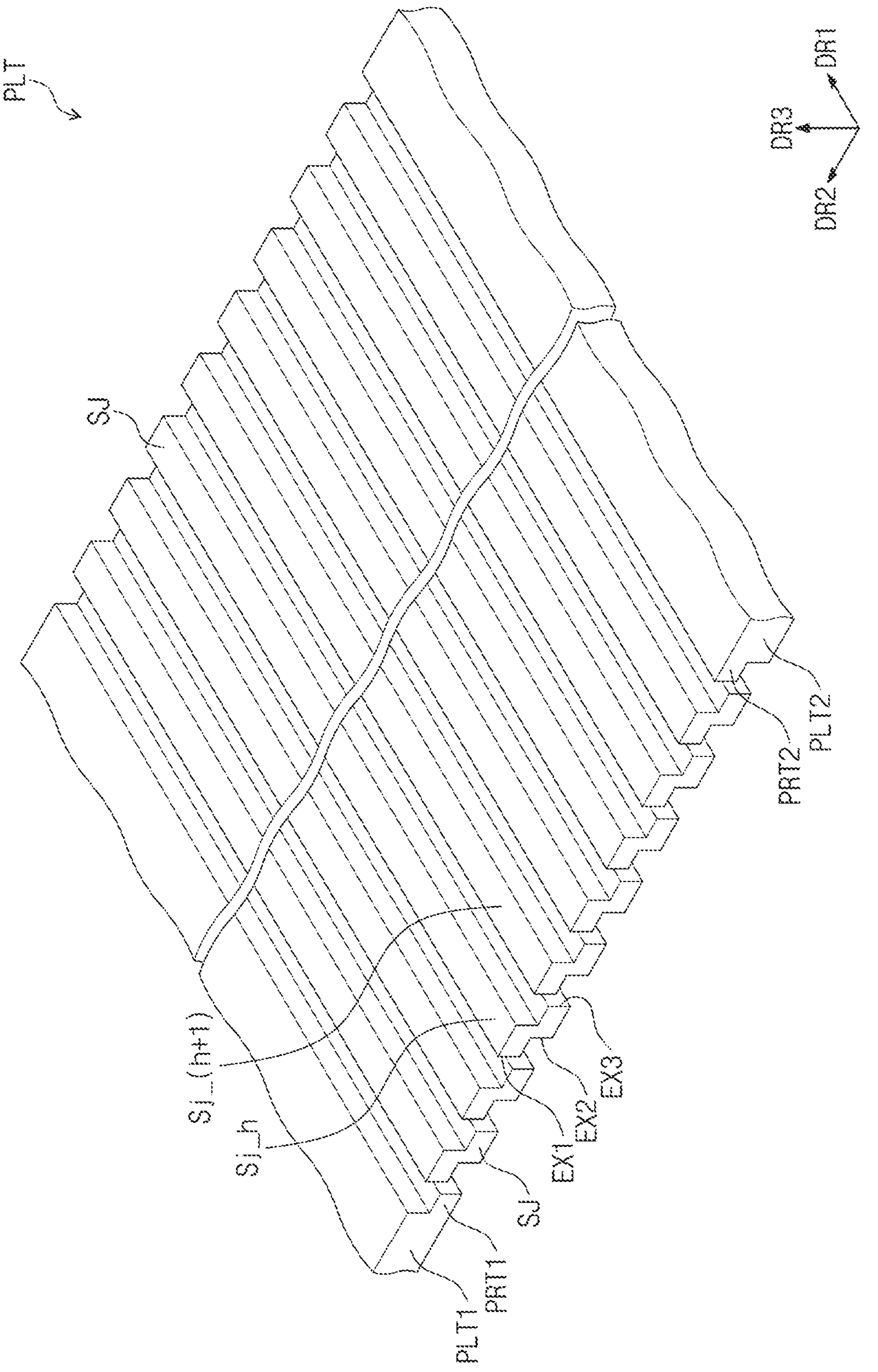
FIG. 11 is an exploded perspective view of a support plate shown in FIG. 10.

FIG. 11 is an exploded perspective view of the support plate shown in FIG. 10.

FIG. 11 shows the support joints SJ and the portions of the first and second support plates PLT1 and PLT2, which are adjacent to the support joints SJ.

Referring to FIGS. 10 and 11, the support joints SJ may extend in the first direction DR1 and may be arranged in the second direction DR2. In an embodiment, for example, the first support plate PLT1 may be disposed at a left side of the support joints SJ, and the second support plate PLT2 may be disposed at a right side of the support joint SJ.

Each of the support joints SJ may include a first extension portion EX1, a second extension portion EX2, and a third extension portion EX3. The first extension portion EX1 may extend toward the first support plate PLT1. The second extension portion EX2 may extend downward from an opposing end of the first extension portion EX1, which is opposite to one end of the first extension portion EX1 facing the first support plate PLT1. The third extension portion EX3 may extend from a lower end of the second extension portion EX2 to the second support plate PLT2.

Each of the support joints SJ may have a stepped shape by the first, second, and third extension portions EX1, EX2, and EX3. An upper surface and a lower surface of each of the support joints SJ may have the stepped shape.

A first extension portion EX1 of an (h+1)-th support joint Sj_(h+1) may be disposed on a third extension portion EX3 of an h-th support joint Sj_h. Here, "h" may be a natural number. An end of the first extension portion EX1 of the (h+1)-th support joint Sj_(h+1) may be disposed adjacent to a second extension portion EX2 of the h-th support joint Sj_h in the second direction DR2.

When the support plate PLT is in the unfolded state as shown in FIG. 10, the first extension portion EX1 of the (h+1)-th support joint Sj_(h+1) may be in contact with the second extension portion EX2 and the third extension portion EX3 of the h-th support joint Sj_h.

In an embodiment, for example, when the support plate PLT is in the unfolded state, the first extension portion EX1 of the (h+1)-th support joint Sj_(h+1) may be in contact with an upper surface of the third extension portion EX3 of the h-th support joint Sj_h. When the support plate PLT is in the unfolded state, the first extension portion EX1 of the (h+1)-th support joint Sj_(h+1) may be in contact with a side surface of the second extension portion EX2 of the h-th support joint Sj_h, which faces the first extension portion EX1 of the (h+1)-th support joint Sj_(h+1).

The support plate PLT may include a first protrusion portion PRT1 protruded from a lower portion of one side of the first support plate PLT1, which faces the support joints SJ, toward the support joints SJ. The support plate PLT may include a second protrusion portion PRT2 protruded from an upper portion of one side of the second support plate PLT2, which faces the support joints SJ, toward the support joints SJ.

The first protrusion portion PRT1 may correspond to the third extension portion EX3. The second protrusion portion PRT2 may correspond to the first extension portion EX1. The one side of the first support plate PLT1 and the one side of the second support plate PLT2 may have a stepped shape by the first protrusion portion PRT1 and the second protrusion portion PRT2.

When the support plate PLT is in the unfolded state, the first protrusion portion PRT1 may be in contact with the first extension portion EX1 and the second extension portion EX2 of the support joint SJ closest to the first support plate PLT1. In an embodiment, for example, the first protrusion portion PRT1 may be in contact with a lower surface of the first extension portion EX1 and a side surface of the second extension portion EX2 of the support joint SJ closest to the first support plate PLT1.

When the support plate PLT is in the unfolded state, the second protrusion portion PRT2 may be in contact with the third extension portion EX3 and the second extension portion EX2 of the support joint SJ closest to the second support plate PLT2. In an embodiment, for example, the second protrusion portion PRT2 may be in contact with an upper surface of the third extension portion EX3 and a side surface of the second extension portion EX2 of the support joint SJ closest to the second support plate PLT2.

Figure 12:
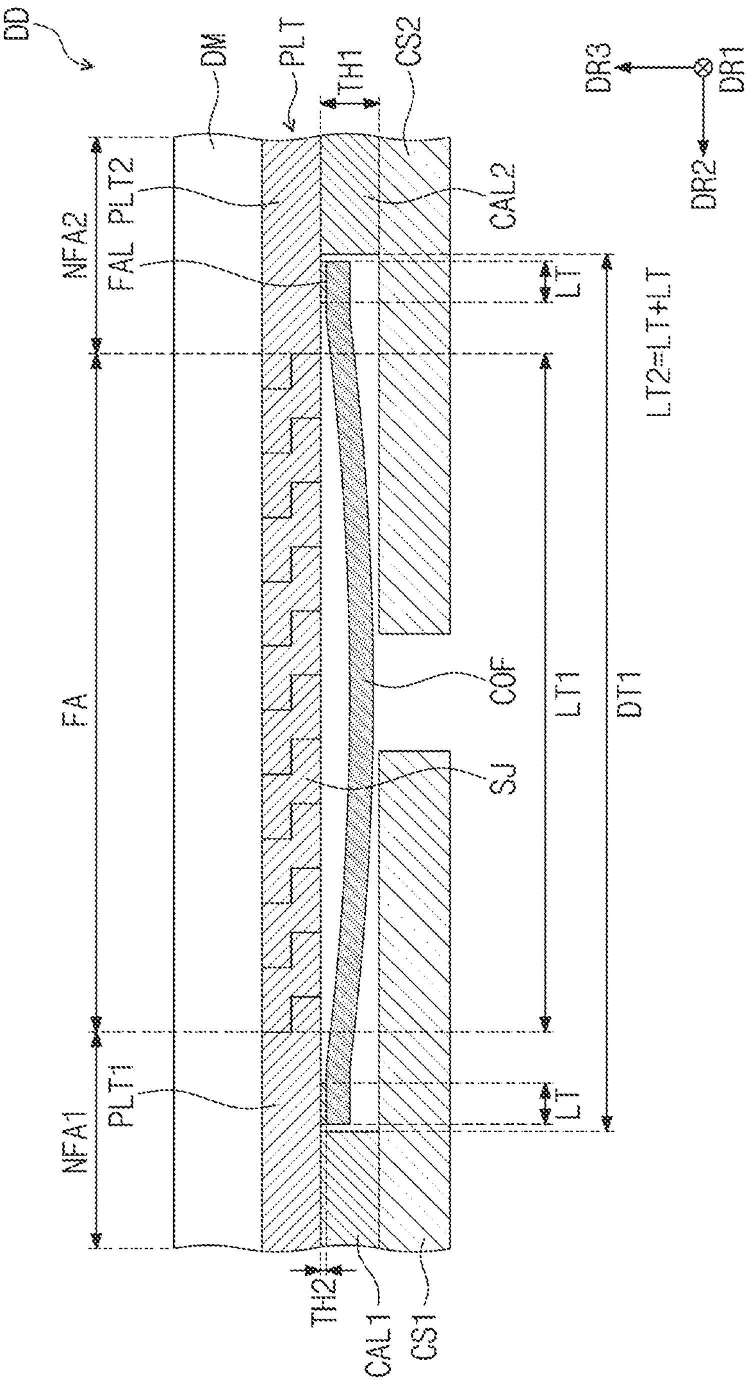
FIG. 12 is a cross-sectional view of the display device shown in FIG. 10 in an unfolded state.
Figure 13:
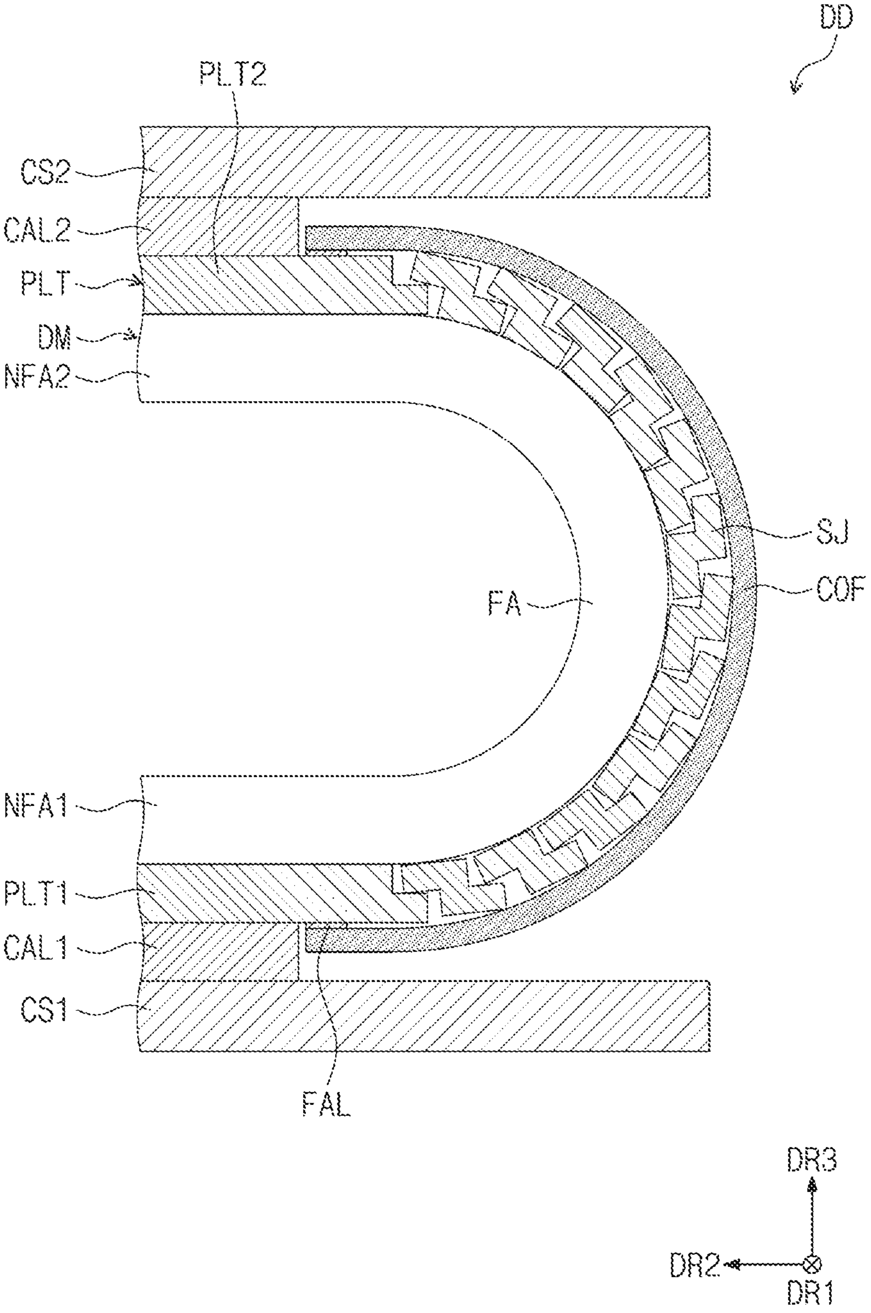
FIG. 13 is a cross-sectional view of the display device shown in FIG. 12 in a folded state.
Figure 14:
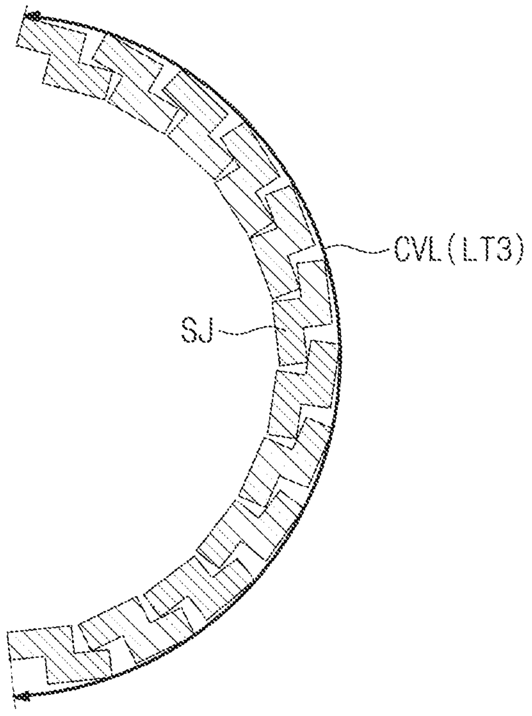
FIG. 14 is a cross-sectional view of support joints shown in FIG. 13.

FIG. 12 is a cross-sectional view of the display device DD shown in FIG. 10 in an unfolded state. FIG. 13 is a cross-sectional view of the display device DD shown in FIG. 12 in a folded state. FIG. 14 is a cross-sectional view of the support joints SJ shown in FIG. 13.

For the convenience of illustration and description, the display module DM is illustrated as a single-layer structure and the window module WM is omitted in FIGS. 12 and 13. In addition, the folding portion FA and portions of the first and second non-folding portions NFA1 and NFA2, which are adjacent to the folding portion FA, are shown in FIGS. 12 and 13.

Referring to FIG. 12, case adhesive layers CAL1 and CAL2 may be disposed under the first support plate PLT1 and the second support plate PLT2, respectively. The case adhesive layers CAL1 and CAL2 may be spaced apart from the film adhesive layers FAL and may be disposed under the first and second support plates PLT1 and PLT2. The case adhesive layers CAL1 and CAL2 may include a pressure sensitive adhesive (PSA).

The case adhesive layers CAL1 and CAL2 may include a first case adhesive layer CAL1 disposed under the first support plate PLT1 and a second case adhesive layer CAL2 disposed under the second support plate PLT2. The first case adhesive layer CAL1 and the second case adhesive layer CAL2 may be disposed outside the film adhesive layers FAL. The cover film COF and the film adhesive layers FAL may be disposed between the first case adhesive layer CAL1 and the second case adhesive layer CAL2.

The first case CS1 and the second case CS2, which are described with reference to FIG. 6, may be disposed respectively under the first case adhesive layer CAL1 and the second case adhesive layer CAL2. The first and second cases CS1 and CS2 may be respectively attached to the first and second support plates PLT1 and PLT2 by the first and second case adhesive layers CAL1 and CAL2.

The display device DD may be stretched out in the second direction DR2 to be in the unfolded state. When the support plate PLT is in the unfolded state, the support joints SJ may be arranged in the second direction DR2 and may be engaged with each other. The support joints SJ may be arranged to be in contact with each other in the second direction DR2.

The one side of the first support plate PLT1 may be engaged with the support joint SJ closest to the first support plate PLT1 and may be in contact with the support joint SJ closest to the first support plate PLT1 in the second direction DR2. The one side of the second support plate PLT2 may be engaged with the support joint SJ closest to the second support plate PLT2 and may be in contact with the support joint SJ closest to the second support plate PLT2 in the second direction DR2.

When the support plate PLT is in the unfolded state, the cover film COF may be spaced apart downward from the support joints SJ, and the cover film COF may not be in contact with the support joints SJ. When the support plate PLT is in the unfolded state, the cover film COF may be sagged.

When the display device DD is in the unfolded state, a thickness in the third direction DR3 of each of the first and second case adhesive layers CAL1 and CAL2 may be defined as a first thickness TH1, and a thickness of each of the film adhesive layers FAL may be defined as a second thickness TH2. When the display device DD is in the unfolded state, a thickness in the third direction DR3 of the cover film COF may be greater than zero (0) and may be smaller than a value obtained by subtracting the second thickness TH2 from the first thickness TH1.

When the display device DD is in the unfolded state, a length in the second direction DR2 of the folding portion FA may be defined as a first length LT1, and a sum of lengths LT in the second direction DR2 of the film adhesive layers FAL may be defined as a second length LT2. In addition, a distance in the second direction DR2 between the first case adhesive layer CAL1 and the second case adhesive layer CAL2 may be defined as a first distance DT1.

Referring to FIGS. 12 and 13, the display device DD may be folded or in a folded state. The folding portion FA may be folded, and the support joints SJ may be arranged in a curved line with a predetermined curvature. When the support plate PLT is folded, the cover film COF may be curved to be in contact with lower portions of the support joints SJ. In an embodiment, for example, the cover film COF may be in contact with the first extension portions EX1 of the support joints SJ.

Referring to FIGS. 13 and 14, when the support plate PLT is folded, a curved line CVL may be defined to extend along the lower portions of the support joints SJ. In an embodiment, for example, the curved line CVL may be defined as an arc connecting one sides of the first extension portions EX1 of the support joints SJ and having a predetermined curvature. A length of the curved line CVL may be referred to as a third length LT3. The curved line CTL may extend to an end of the support joint SJ arranged at one end among the support joints SJ and to an end of the support joint SJ arranged at the other end, which is opposite to and disposed farthest from the one end, among the support joints SJ.

Referring to FIGS. 12, 13, and 14, a distance between opposing sides of the cover film COF, which are opposite to each other in the second direction DR2, may be defined as a length of the cover film COF. The length of the cover film COF may be defined as the length of the cover film COF when the cover film COF is unfolded to be flat in the second direction DR2.

The length of the cover film COF may be equal to or greater than a value obtained by adding the first length LT1 to the second length LT2 and may be equal to or smaller than a value obtained by adding the third length LT3 to the value obtained by subtracting the first length LT1 from the first distance DT1.

Referring to FIGS. 11, 12, and 13, in a case where the length of the cover film COF is defined as the above-described length, the cover film COF may be in contact with the support joints SJ in the folded display device DD and may support the support joints SJ.

When the display device DD is unfolded, the support joints SJ may be arranged in the second direction DR2 between the display module DM and the cover film COF. The support joints SJ having the stepped shape may be engaged with each other to be in contact with each other in the second direction DR2, and the support joints SJ may be arranged flat.

The first extension portion EX1 of each of the support joints SJ shown in FIG. 11 may be disposed on the third extension portion EX3 of the support joint SJ disposed adjacent thereto, and the first extension portion EX1 of each of the support joints SJ may be in contact with the second extension portion EX2 of the support joint SJ disposed adjacent thereto. In this structure, the support joints SJ may be arranged in the second direction DR2.

Since the support joints SJ are in contact with each other without being spaced apart from each other when the display device DD is unfolded, a crease may not be visually recognized in the folding portion FA.

The support joints SJ may be arranged in a narrow space between the display module DM and the cover film COF. In addition, when the display device DD is folded, the shape of the cover film COF may be changed to the curved line, and the cover film COF may be in contact with the support joints SJ to support the support joints SJ.

As the shape of the cover film COF is changed to the curved line and the cover film COF supports the support joints SJ, the support joints may be easily arranged in the curved line shape. Accordingly, the support joints SJ may be arranged adjacent to each other and may be easily arranged in the curved line shape in the narrow space between the display module DM and the cover film COF. Since the support joints SJ are easily arranged in the curved line shape, a separate structure to rotatably couple the support joints SJ may not be required.

As the cover film COF covers the lower portions of the support joints SJ, foreign substances may not be introduced into between the support joints SJ. Accordingly, the foreign substances may not be introduced to the display module DM, and thus, the damage of the display module DM, which is caused by the foreign substances, may be prevented.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display module;

a support plate disposed under the display module and comprising a first support plate, a second support plate, and a plurality of support joints disposed between the first and second support plates and arranged to be engaged with each other, wherein each of the plurality of support joints has a stepped shape; and a cover film disposed under the support plate and covering the plurality of support joints, wherein the plurality of support joints is not attached to the cover film.

2. The display device of claim 1, wherein the cover film is spaced apart from the plurality of support joints when the support plate is unfolded.

3. The display device of claim 1, wherein, when the support plate is folded, the plurality of support joints are arranged in a curved line shape having a predetermined curvature, and the cover film is curved to be in contact with the plurality of support joints.

4. The display device of claim 1, wherein the display module further comprises:

an electronic panel which displays an image; and a barrier layer disposed under the electronic panel, wherein the barrier layer is disposed between the electronic panel and the support plate, and the plurality of support joints is not attached to the barrier layer.

5. The display device of claim 4, further comprising:

an adhesive layer disposed between the support plate and the barrier layer, wherein the adhesive layer is not disposed on the plurality of support joints.

6. The display device of claim 1, wherein the cover film is disposed under the plurality of support joints and extends to a portion of the first support plate, which is adjacent to the plurality of support joints, and to a portion of the second support plate, which is adjacent to the plurality of support joints.

7. The display device of claim 1, further comprising:

a plurality of film adhesive layers disposed between the cover film and the first and second support plates, wherein the plurality of film adhesive layers is not disposed between the cover film and the plurality of support joints.

8. The display device of claim 7, wherein the plurality of film adhesive layers is disposed under a portion of the first support plate, which is adjacent to the plurality of support joints, and a portion of the second support plate, which is adjacent to the plurality of support joints.

9. The display device of claim 8, wherein plurality of the film adhesive layers is adjacent to opposing sides of the cover film.

10. The display device of claim 7, further comprising:

a first case adhesive layer disposed under the first support plate; and a second case adhesive layer disposed under the second support plate, wherein the cover film and the plurality of film adhesive layers are disposed between the first case adhesive layer and the second case adhesive layer.

11. The display device of claim 10, wherein the plurality of support joints extends in a first direction and are arranged in a second direction crossing the first direction, the first support plate, the plurality of support joints and the second support plate are arranged in the second direction, and the display module comprises:

a folding portion overlapping the plurality of support joints in a third direction perpendicular to the first and second directions;

a first non-folding portion overlapping the first support plate in the third direction; and a second non-folding portion overlapping the second support plate in the third direction.

12. The display device of claim 11, wherein the cover film has a thickness greater than zero (0) and less than a value obtained by subtracting a thickness of each of the plurality of film adhesive layers from a thickness of each of the first and second case adhesive layers in the third direction.

13. The display device of claim 11, wherein a length in the second direction of the folding portion is defined as a first length, a distance in the second direction between the first and second case adhesive layers is defined as a first distance, a sum of lengths in the second direction of the film adhesive layers is defined as a second length, the plurality of support joints is arranged along a curved line having a predetermined curvature when the support plate is folded, a length of a curved line extending along lower sides of the plurality of support joints is defined as a third length, and a length in the second direction of the cover film is equal to or greater than a value obtained by adding the second length to the first length and equal to or less than a value obtained by adding the third length to a value obtained by subtracting the first length from the first distance.

14. The display device of claim 1, wherein each of the plurality of support joints comprises:

a first extension portion extending toward the first support plate;

a second extension portion extending downward from an opposing end of the first extension portion, which is opposite to one end of the first extension portion facing the first support plate; and a third extension portion extending from a lower end of the second extension portion toward the second support plate.

15. The display device of claim 14, wherein a first extension portion of an (h+1)-th support joint of the plurality of support joints is disposed on a third extension portion of an h-th support joint, wherein h is a natural number, and an end of the first extension portion of the (h+1)-th support joint of the plurality of support joints is disposed adjacent to a second extension portion of the h-th support joint.

16. The display device of claim 15, wherein the first extension portion of the (h+1)-th support joint is in contact with the second and third extension portions of the h-th support joint when the support plate is unfolded.

17. The display device of claim 14, wherein the support plate further comprises a first protrusion portion protruded from a lower portion of one side of the first support plate facing the plurality of support joints toward the plurality of support joints.

18. The display device of claim 14, wherein the support plate further comprises a second protrusion portion protruded from an upper portion of one side of the second support plate facing the plurality of support joints toward the plurality of support joints.

19. A display device comprising:

a display panel;

a barrier layer disposed under the display panel;

a support plate disposed under the barrier layer and comprising a first support plate, a second support plate, and a plurality of support joints disposed between the first and second support plates and arranged to be engaged with each other, wherein each of the plurality of support joints has a stepped shape; and a cover film disposed under the support plate and covering the plurality of support joints, wherein the plurality of support joints is not attached to the cover film and the barrier layer.

* * * * *